(12) United States Patent
Park (10) Patent No.: US 11,643,036 B2
(45) Date of Patent: May 9, 2023

(54) AIRBAG CONTROLLER FOR VEHICLE

(71) Applicant: HYUNDAI MOBIS CO., LTD., Seoul (KR)

(72) Inventor: Jeong Gyun Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 104 days.

(21) Appl. No.: 17/156,949

(22) Filed: Jan. 25, 2021

(65) Prior Publication Data

US 2021/0245691 A1 Aug. 12, 2021

(30) Foreign Application Priority Data

Feb. 10, 2020 (KR) .................... 10-2020-0015917

(51) Int. Cl.
*B60R 21/01* (2006.01)

(52) U.S. Cl.
CPC .... *B60R 21/01* (2013.01); *B60R 2021/01006* (2013.01); *B60R 2021/01286* (2013.01)

(58) Field of Classification Search
CPC ......... B60R 21/01; B60R 2021/01006; B60R 2021/01286; H05K 5/006; H05K 9/0064
See application file for complete search history.

(56) References Cited

U.S. PATENT DOCUMENTS

| | | | | | |
|---|---|---|---|---|---|
| 4,700,973 A | * | 10/1987 | Gademann | ............. | G01P 1/023 73/514.12 |
| 6,188,019 B1 | * | 2/2001 | Baur | .................... | H05K 9/0039 361/752 |
| 6,362,971 B1 | * | 3/2002 | Skofljanec | .......... | B60R 16/0239 361/752 |
| 6,940,412 B2 | * | 9/2005 | Clark | ................... | H05K 9/0039 340/687 |
| 7,291,023 B1 | * | 11/2007 | Still | ..................... | G01D 11/245 439/67 |
| 2010/0078918 A1 | * | 4/2010 | Azuma | ............... | B60R 21/0132 280/728.2 |
| 2011/0168475 A1 | * | 7/2011 | Moser | ..................... | B60R 21/01 180/271 |
| 2014/0285986 A1 | * | 9/2014 | Sano | .................... | H05K 9/0064 361/752 |
| 2014/0353457 A1 | * | 12/2014 | Ohmoto | ............... | H05K 5/0073 248/548 |

(Continued)

FOREIGN PATENT DOCUMENTS

DE  102008040157 A1 *  1/2010  ......... B60R 16/0239
KR  10-2005-0026069 A     3/2005

(Continued)

*Primary Examiner* — Paul N Dickson
*Assistant Examiner* — Kurtis Nielson
(74) *Attorney, Agent, or Firm* — NovoTechIP International PLLC (57) ABSTRACT

An airbag controller for a vehicle is proposed. In the airbag controller for a vehicle, an integrated plastic housing without a cover is used to fix a PCB, and a separate grounding device connecting the PCB positioned inside the plastic housing to a vehicle body positioned outside the plastic housing is used in the airbag controller to solve a problem of grounding. Accordingly, it is possible to make the airbag controller be slim and the overall size of the airbag controller be compact.

6 Claims, 5 Drawing Sheets

(56) References Cited

U.S. PATENT DOCUMENTS

| | | | |
|---|---|---|---|
| 2015/0264829 A1* | 9/2015 | Christoph | H05K 5/03 |
| | | | 361/753 |
| 2016/0031398 A1* | 2/2016 | Azuma | H05K 5/0047 |
| | | | 361/752 |
| 2020/0112108 A1* | 4/2020 | Yoshida | H05K 1/0215 |
| 2020/0136360 A1* | 4/2020 | Yoshida | H05K 9/0064 |

FOREIGN PATENT DOCUMENTS

| | | | |
|---|---|---|---|
| KR | 101372551 B1 * | 3/2014 | |
| WO | WO-0030899 A1 * | 6/2000 | ............. B60R 21/01 |
| WO | WO-0055014 A2 * | 9/2000 | ............. B60R 21/01 |
| WO | WO-2006005769 A1 * | 1/2006 | ............ B60R 21/013 |
| WO | WO-2010014550 A2 * | 2/2010 | ........ B29C 45/14655 |

\* cited by examiner

AIRBAG CONTROLLER FOR VEHICLE

CROSS REFERENCE TO RELATED APPLICATION

The present application claims priority to Korean Patent Application No. 10-2020-0015917, filed Feb. 10, 2020, the entire contents of which is incorporated herein for all purposes by this reference.

BACKGROUND OF THE INVENTION

Field of the Invention

The present invention relates generally to an airbag controller for a vehicle and, more particularly, to a technique of an airbag controller capable of realizing weight reduction, cost reduction, and slimness.

Description of the Related Art

As a measure to protect the safety of vehicle occupants, various types of airbag devices are provided in vehicles.

Typically, an airbag device of a vehicle includes an inflator that generates airbag gas, an airbag cushion deployed by the pressure of the airbag gas injected from the inflator and protecting an occupant, and an airbag controller (ACU) receiving signal from a sensor and controlling the operation of the inflator.

A conventional airbag controller includes a housing in which a printed circuit board (PCB) is placed, and a cover coupled to the housing via a plurality of screws (bolts) for fixation of the PCB. The housing and the cover are separately provided, thereby increasing the number of the components and manufacturing cost.

The conventional airbag controller is configured to ground by using the cover. Therefore, the cover is made of a steel plate capable of applying electricity to connect a grounding portion of the PCB to a vehicle body. Due to the cover made of a steel plate, the weight of the airbag control vehicle is heavy.

In addition, when the cover is made of a steel plate for grounding, because there is a high risk of moisture flowing into the housing and contacting the PCB, the cover should have a separate space for preventing moisture inflow by providing a stepped layer therein. Therefore, the conventional airbag controller has a limitation in reducing the height (thickness) thereof, so it is difficult to make the size of the airbag controller be compact.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose an airbag controller for a vehicle, wherein a cover-integrated housing is formed by plastic injection molding so that the number of components, weight, and manufacturing cost may be reduced.

Another objective of the present invention is intended to propose an airbag controller for a vehicle, the airbag controller being configured to use a grounding device, in which a first side thereof is connected to a grounding portion of a PCB coupled to a housing and a second side thereof is exposed to the outside of the housing and connected to a vehicle body, to perform grounding. Compared to a conventional airbag controller in which the cover is made of a steel plate for grounding, the airbag controller of the present invention may realize the weight reduction. In particular, as the separate grounding device that is in contact with the vehicle body at the outside of the housing is used in the airbag controller, the airbag controller does not need to have a separate space for preventing moisture inflow into the housing. Whereby, it is possible to make the overall size of the airbag controller be compact.

In order to achieve the above objective, according to one aspect of the present invention, there is provided an airbag controller for a vehicle. The airbag controller for a vehicle includes: an integrated plastic housing; a printed circuit board (PCB) placed such that the PCB may be positioned inside the plastic housing; and a grounding device configured to complete grounding by a first side thereof connected to a grounding portion of the PCB positioned inside the plastic housing and a second side thereof connected to a vehicle body at an outside of the plastic housing.

The airbag controller may further include a PCB placing surface provided in an inside of the plastic housing; wherein the PCB placing surface may be connected to the outside of the plastic housing via an opening formed in the plastic housing; and the PCB may be configured to be inserted into the plastic housing via the opening of the plastic housing and be placed on the PCB placing surface.

The grounding device may include: a ground ring configured to be connected to the grounding portion of the PCB; and a ground bushing configured to connect the ground ring to the vehicle body, wherein the ground ring and the ground bushing may be made of metal capable of applying electricity.

The ground ring may include: a ring-shaped PCB contact portion configured to be connected to the grounding portion of the PCB in a surface contact manner; a ring-shaped bushing contact portion configured to be connected to the ground bushing in a surface contact manner; and a connecting portion configured to connect the PCB contact portion to the bushing contact portion, wherein the PCB contact portion may be integrally coupled to the plastic housing by insert injection molding during injection molding of the plastic housing.

During the injection molding of the plastic housing, a plurality of vehicle body mounting portions, which may protrude to the outside of the plastic housing, may be formed to be integrated with the plastic housing; and the bushing contact portion and the ground bushing may be configured to be positioned at the outside of the plastic housing, as the bushing contact portion and the ground bushing are integrally coupled to an associated one of the vehicle body mounting portions by insert injection molding.

A fastening member may pass through the PCB contact portion of the ground ring and the grounding portion of the PCB, so that the PCB contact portion and the grounding portion may be connected to each other in a surface contact manner and be fixed in the plastic housing; and a fastening member may pass through the busing contact portion of the ground ring and the ground bushing, so that the busing contact portion and the ground bushing may be connected to each other in a surface connect manner and be coupled to each other to be fixed in the vehicle body.

The ground ring may include a plurality of ground rings, and any one of the plurality of ground rings may be directly coupled to the vehicle body without the ground bushing at the outside of the plastic housing.

According to the present invention, the airbag controller for a vehicle is configured to use the integrated plastic housing without a cover to fix the PCB, and thus the number of components, weight, and manufacturing cost can be reduced. In particular, as the airbag controller having slimness and compact size is realized due to the integrated plastic housing, the airbag controller can be mounted to an electric vehicle or an autonomous vehicle without a console part.

Furthermore, the airbag controller for a vehicle according to an embodiment of the present invention is configured to use the separate grounding device that connects the PCB positioned inside the plastic housing to a portion of the vehicle body that is positioned outside the plastic housing in an effort to solve the problem of grounding, so that stability of grounding can be realized.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

In the following description, the structural or functional description specified to exemplary embodiments according to the concept of the present invention is intended to describe the exemplary embodiments, so it should be understood that the present invention may be variously embodied, without being limited to the exemplary embodiments.

An embodiment described herein may be changed in various ways and various shapes, so specific embodiments are shown in the drawings and will be described in detail in this specification. However, it should be understood that the exemplary embodiments according to the concept of the present invention are not limited to the embodiment which will be described hereinbelow with reference to the accompanying drawings, but all of modifications, equivalents, and substitutions are included in the scope and spirit of the invention.

It will be understood that although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing a particular embodiment only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

A controller according to the exemplary embodiment of the present invention may be realized by a nonvolatile memory (not shown), which consists of an algorithm configured to control operations of various components of a vehicle or data regarding software instructions to play the algorithm, and a processor (not shown), which is configured to perform operations described below using the data stored in the memory. Here, the memory and processor may be realized as separate chips. Alternately, the memory and processor may be realized as an integrated single chip. More than one type of processor may be used.

Hereinbelow, an airbag controller for a vehicle according to an exemplary embodiment of the present invention will be described with reference to the accompanying drawings.

As shown in FIGS. 1 to 5, the airbag controller for a vehicle according to the present invention includes: a plastic housing 10 having in an integrated form without a cover; a printed circuit board (PCB) 10 placed to be positioned inside the plastic housing 10; and a grounding device 40 configured to complete grounding with a first side thereof connected to a grounding portion 21 of the PCB 20 positioned inside the plastic housing 10 and a second side thereof connected to a vehicle body 30 at the outside of the plastic housing 10.

A conventional airbag controller has disadvantages in that the number of components and manufacturing cost increase as a housing on which a PCB is placed and a cover coupled to the housing are separately provided. In addition, the conventional airbag controller consists of the cover in which the entire portion thereof is made of a steel plate capable of applying electricity for grounding, thereby increasing the weight of the airbag controller. In particular, the conventional airbag controller in which the cover is made of a steel plate should have a separate space for preventing moisture inflow, so that it is difficult to make the overall size of the airbag controller be compact.

Figure 1:
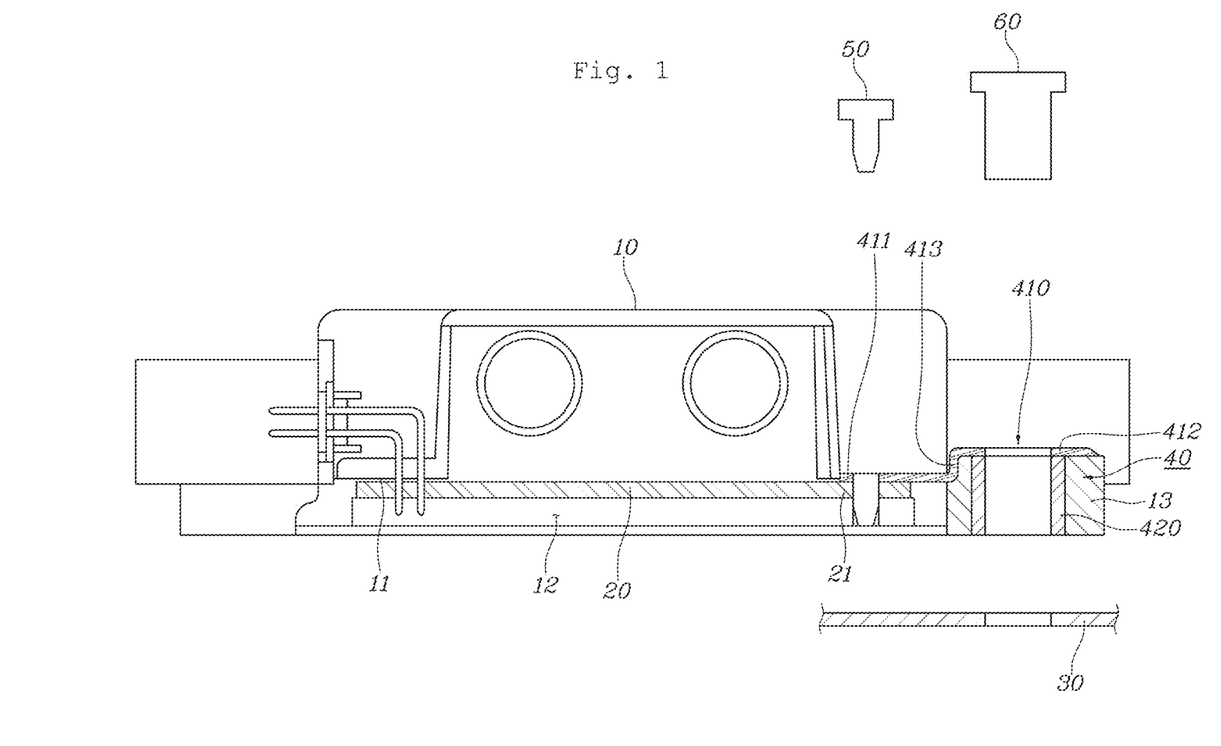
FIG. 1 is a section view showing an airbag controller of a vehicle according to the present invention.

However, according to the embodiment of the present invention, as the housing on which the PCB is placed is formed in the integrated plastic housing 10 without the cover, the airbag controller of the present invention may have advantages of reducing the number of components, weight, and manufacturing cost.

The airbag controller is mounted to a lower end of a vehicle console, which is the center of the vehicle, because the airbag controller is equipped with a sensor detecting vehicle's roll, yaw, and pitch, and accelerations X, Y, and Z.

However, an interior of an electric vehicle that is in the spotlight as an eco-friendly vehicle or autonomous vehicle has a flat floor without a console for a wide interior space.

Therefore, since it is difficult to mount the conventional airbag controller having a thick height (thickness) to the electric vehicle or autonomous vehicle without a console part, the airbag controller is required to be slimmed. In order to make the airbag controller be slimmer, the airbag controller according to the embodiment of the present invention uses the integrated plastic housing 10 without a cover. Accordingly, the airbag controller may realize reduction of the number of components, weight reduction, and manufacturing cost reduction.

In addition, as the integrated plastic housing 10 without a cover is used in the airbag controller, there may be a problem in grounding with the vehicle body 30. In the embodiment of the present invention, the airbag controller uses the separate grounding device 40, which is connected to the PCB 20 positioned inside the plastic housing 10 and protrudes to the outside of the plastic housing 10 while the portion protruding to the outside of the plastic housing 10 is connected to the vehicle body 30, to solve the problem of grounding, thereby being characterized by securing stability.

In particular, as the separate grounding device 40 being in contact with the vehicle body 30 at the outside of the plastic housing 10 is used in the airbag controller, the airbag controller does not need to have the separate space for preventing moisture flowing into the plastic housing 10, and it is possible to realize the airbag controller having slimness and make the overall size thereof be compact.

Describing a detailed configuration of the present invention, a PCB placing surface 11 is provided in the inside of the plastic housing 10, the PCB placing surface 11 is connected to the outside of the plastic housing 10 via an opening 12 of the plastic housing 10, and the PCB 20 is inserted into the plastic housing 10 via the opening 12 of the plastic housing 10 and is placed on the PCB placing surface 11.

Figure 2:
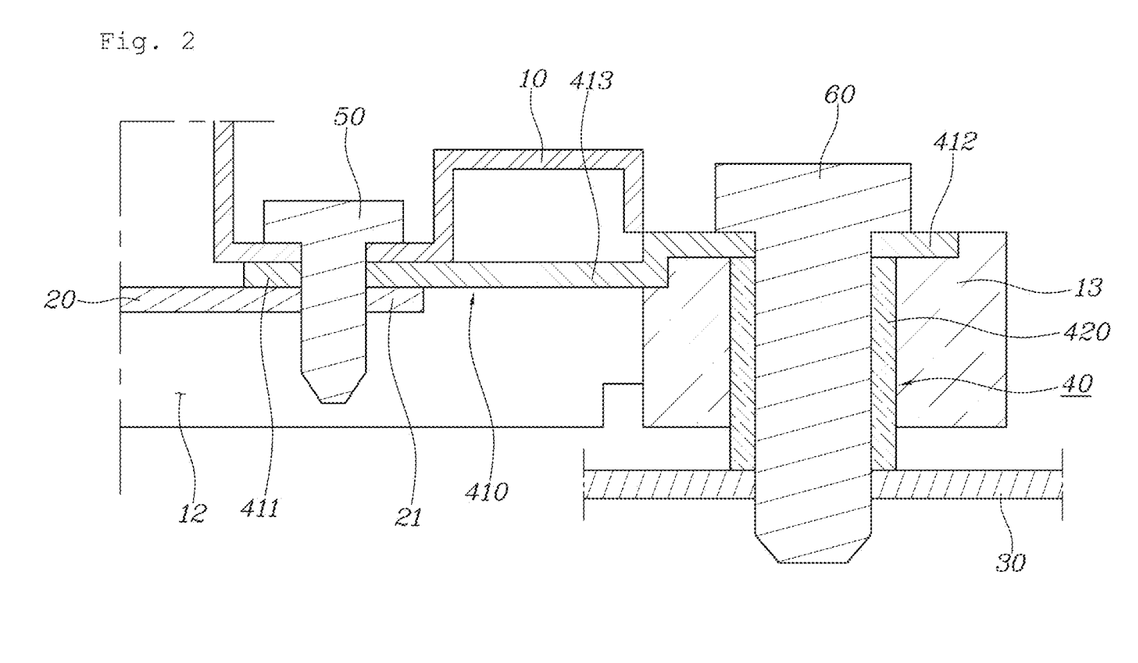
FIG. 2 is an enlarged view showing a connecting portion between a PCB and a ground device in FIG. 1.
Figure 3:
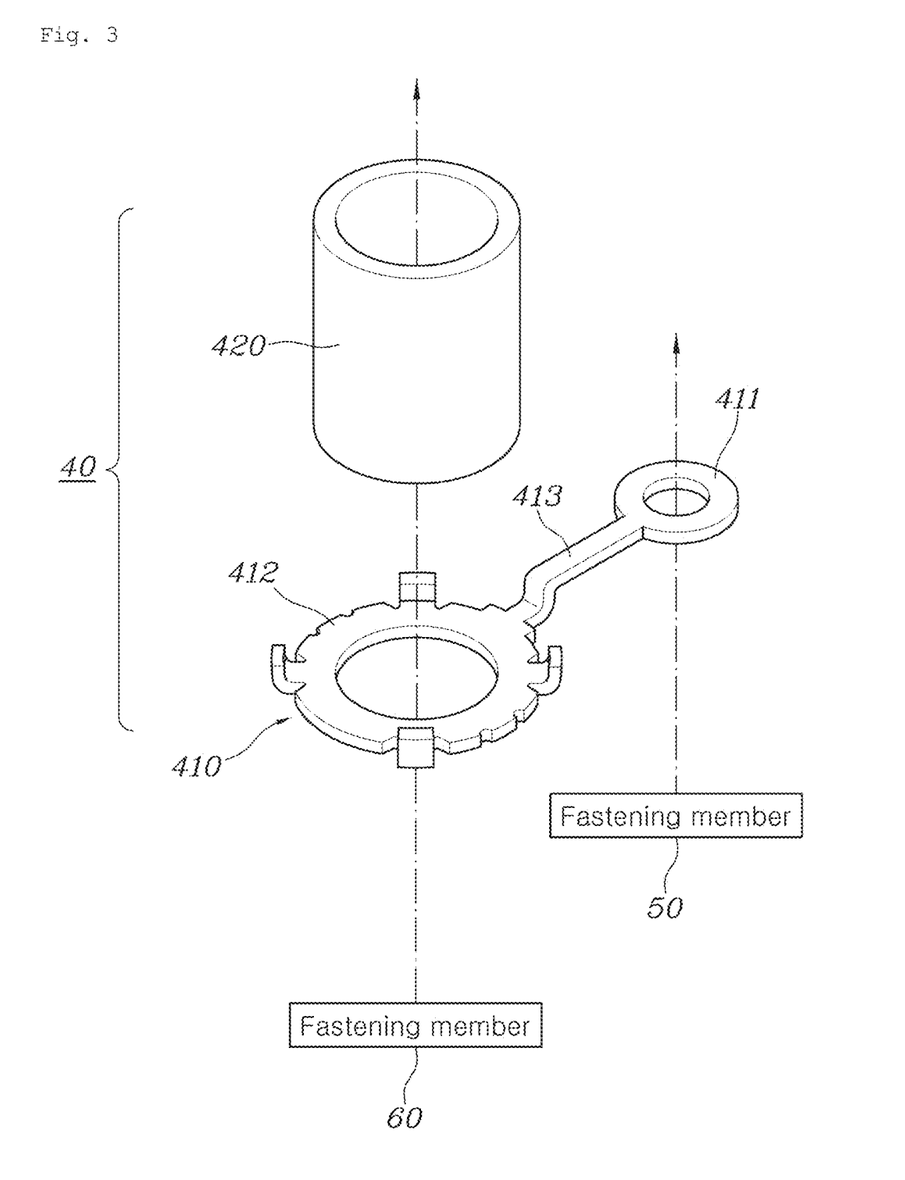
FIG. 3 is a perspective view showing the ground device according to the present invention.
Figure 4:
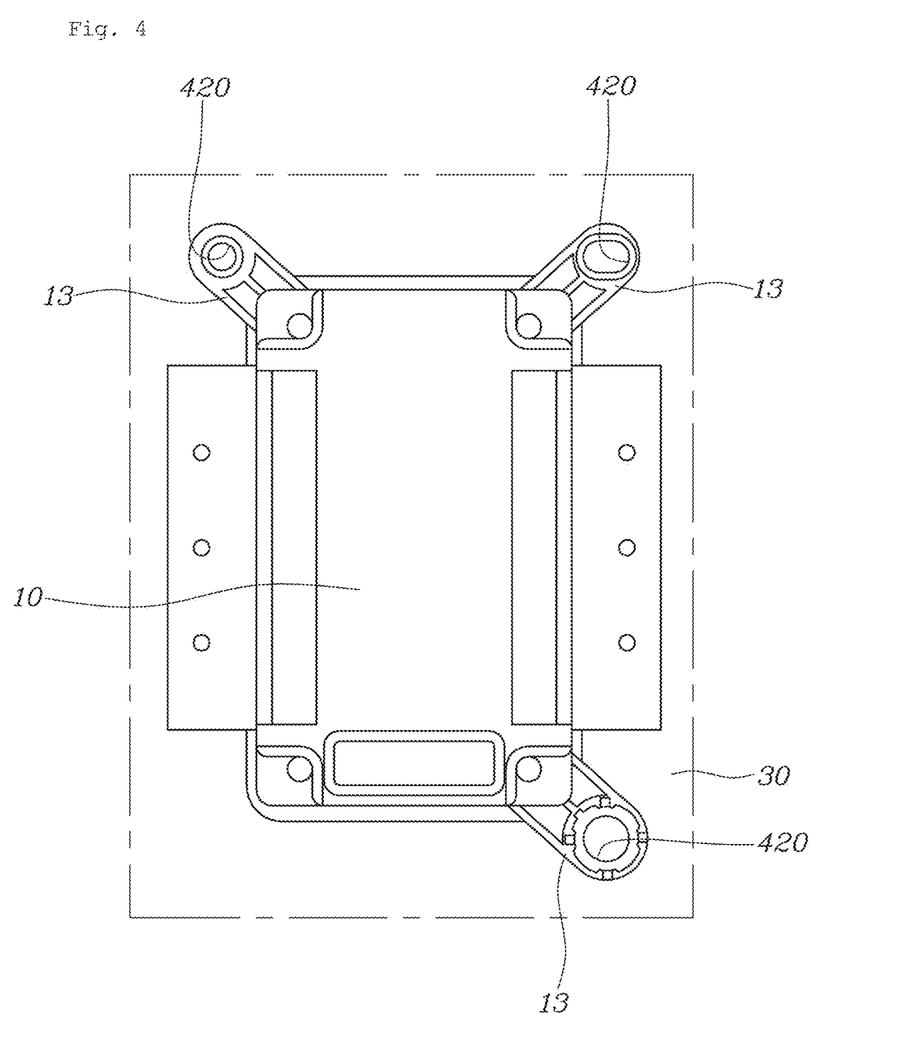
FIGS. 4 and 5 are views showing installation in which the airbag controller for a vehicle according to the present invention is connected to a vehicle body.

The grounding device 40 includes a ground ring 410 connected to the grounding portion 21 of the PCB 20, and a ground bushing 420 connecting the ground ring 410 to the vehicle body 30.

Preferably, both the ground ring 410 and the ground bushing 420 are made of metal (steel material) capable of applying electricity, but may be made of various materials capable of applying electricity.

The ground ring 410 includes a ring-shaped PCB contact portion 411 connected to the grounding portion 21 of the PCB 20 in a surface contact manner, a ring-shaped bushing contact portion 412 connected to the ground bushing 420 in a surface contact manner, and a connecting portion 413 connecting the PCB contact portion 411 to the bushing contact portion 412.

As the PCB contact portion 411 of the ground ring 410 and the grounding portion 21 of the PCB 20 are electrically connected to each other in the surface contact manner, more stable grounding between the ground ring 410 and the PCB 20 may be realized. Furthermore, as the bushing contact portion 412 of the ground ring 410 and the ground bushing 420 are electrically connected to each other in the surface contact manner, more stable grounding between the ground ring 410 and the ground bushing 420 may be realized.

The plastic housing 10 is formed by injection molding, and during the injection molding of the plastic housing 10, the PCB contact portion 411 of the ground ring 410 is integrally coupled to the plastic housing 10 by insert injection molding. Accordingly, the PCB contact portion 411 may provide a stronger coupling force.

During the injection molding of the plastic housing 10, a plurality of vehicle body mounting portions 13, which protrude to the outside of the plastic housing 10, is formed to be integrated with the plastic housing 10. As the bushing contact portion 412 of the ground ring 410 and the ground bushing 420 are integrally coupled to an associated one of the vehicle body mounting portions 13 by insert injection molding, the bushing contact portion 412 and the ground bushing 420 are configured to be positioned at the outside of the plastic housing 10.

In particular, as the bushing contact portion 412 of the ground ring 410 and the ground bushing 420 are integrally coupled to the associated one of the vehicle body mounting portions 13 by insert injection molding, a stronger coupling force may be secured.

The vehicle body mounting portions 13 of the plastic housing 10 are coupled to the vehicle body 30 via fastening members. It is preferable that at least one vehicle body mounting portion 13 is provided on the plastic housing 10 in order to maintain a stronger coupling force between the plastic housing 10 and the vehicle body 30.

When the PCB 20 is inserted into the plastic housing 10 by passing through the opening 12 of the plastic housing 10 and is placed on the PCB placing surface 11, the grounding portion 21 of the PCB 20 is brought into contact with the PCB contact portion 411 of the ground ring 410 coupled to the plastic housing 10 by insert injection molding. Then, when a fastening member 50 passes through the PCB contact portion 411 and the grounding portion 21 of the PCB 20, the PCB contact portion 411 and the grounding portion 21 of the PCB 20 are coupled to each other to be fixed in the plastic housing 10 while being connected to each other in the surface contact manner.

When a fastening member 60 passes through the bushing contact portion 412 of the ground ring 410 and the ground bushing 420, which are integrally coupled to the associated one of the vehicle body mounting portions 13 of the plastic housing 10 by insert injection molding, the bushing contact portion 412 and the ground bushing 420 are connected to each other in the surface contact manner due to the fastening member 60. In addition, as the ground bushing 420 is coupled to the vehicle body 30, the grounding is completed by the connection between the airbag controller and the vehicle body 30.

Figure 5:
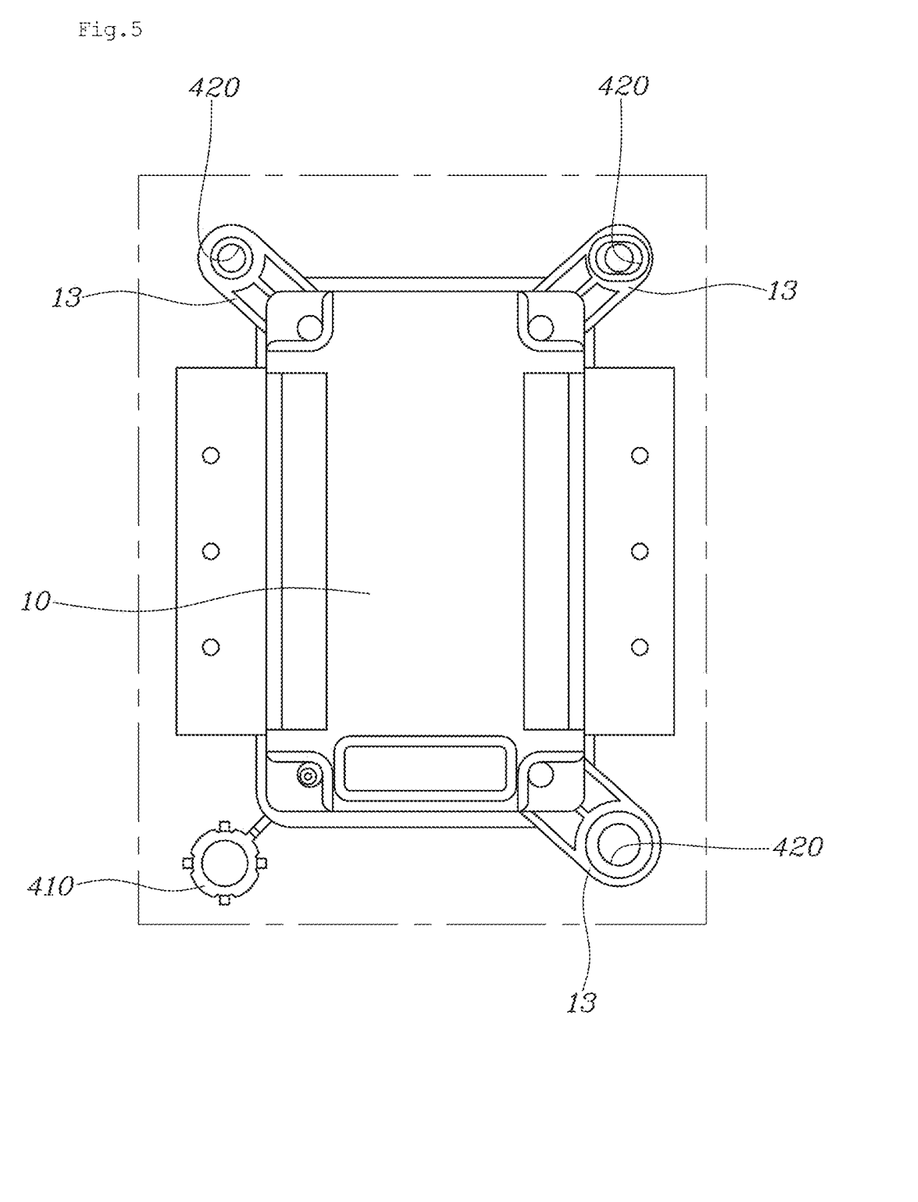

According to the embodiment of the present invention, a plurality of ground rings 410 is provided for stably grounding. As shown in FIG. 5, if necessary, any one of the plurality of ground rings 410 is coupled to the vehicle body 30 without the ground bushing 420 at the outside of the plastic housing 10, and thus stability of grounding may be secured.

As described above, the airbag controller for a vehicle according to the embodiment of the present invention is configured to use the integrated plastic housing 10 without a cover to fix the PCB 20, thereby reducing the number of components, weight, and manufacturing cost. In addition, as the airbag controller having slimness and compact size is realized due to the integrated plastic housing 10, the airbag controller of the present invention may be mounted to an electric vehicle or an autonomous vehicle without a console part.

Furthermore, the airbag controller for a vehicle according to the embodiment of the present invention is configured to use the separate grounding device 40 that connects the PCB 20 positioned inside the plastic housing 10 to the vehicle body 30 positioned outside the plastic housing 10 to solve the problem of grounding, and thus stability of grounding may be secured.

Although the preferred embodiment of the present invention has been described for illustrative purposes, those skilled in the art will appreciate that various modifications, additions and substitutions are possible, without departing from the scope and spirit of the present invention as disclosed in the accompanying claims.

What is claimed is:

1. An airbag controller for a vehicle, comprising:
    a plastic housing having an inner space, an opening exposing the inner space and a first hole extending through a corner portion of the plastic housing;
    a printed circuit board (PCB) disposed entirely within the inner space of the plastic housing and having a ground portion disposed at the corner portion of the plastic housing and having a second hole aligned with the first hole of the plastic housing;
    a grounding device comprising:
        a first end portion disposed in the plastic housing and in direct contact with the ground portion of the PCB board, the first end portion sandwiched between the ground portion of the PCB board and the corner portion of the plastic housing and having a third hole aligned with the first and second holes; and
        a second end portion disposed outside the plastic housing and connected to a vehicle body; and
        a connection portion extending between the first and second end portions; and
    a first fastening member extending through the first, second and third holes and configured to keep the first end portion of the grounding device and ground portion of the PCB in contact with each other and fixed to the corner portion of the plastic housing,
    wherein the PCB is exposed externally of the airbag controller via the opening of the plastic housing.

2. The airbag controller of claim 1, wherein the first and second end portions of the grounding device are of a ring shape.

3. The airbag controller of claim 1, further comprising a ground bushing extending between the second end portion of the grounding device and the vehicle body.

4. The airbag controller of claim 3, further comprising a second fastening member configured to keep the second end portion of the grounding device and the vehicle body fixed to the vehicle body.

5. The airbag controller of claim 4, wherein the second fastening member extends through the second end portion of the grounding device, the ground bushing and the vehicle body.

6. The airbag controller of claim 1, wherein the second end portion is in direct contact with the vehicle body.

* * * * *